US011916419B2

(12) United States Patent
Takahashi

(10) Patent No.: US 11,916,419 B2
(45) Date of Patent: Feb. 27, 2024

(54) BATTERY CONTROL DEVICE, BATTERY CONTROL METHOD, CONTROL PROGRAM, AND VEHICLE

(71) Applicant: TOYOTA JIDOSHA KABUSHIKI KAISHA, Toyota (JP)

(72) Inventor: Naoya Takahashi, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 17/248,831

(22) Filed: Feb. 10, 2021

(65) Prior Publication Data
US 2021/0257847 A1    Aug. 19, 2021

(30) Foreign Application Priority Data

Feb. 17, 2020  (JP) .................................. 2020-024334
Nov. 19, 2020  (JP) .................................. 2020-192459

(51) Int. Cl.
*H02J 7/00* (2006.01)
*B60R 16/033* (2006.01)

(52) U.S. Cl.
CPC .......... *H02J 7/0047* (2013.01); *B60R 16/033* (2013.01)

(58) Field of Classification Search
CPC ....... H02J 7/0047; B60R 16/033; B60L 53/65
See application file for complete search history.

(56) References Cited

U.S. PATENT DOCUMENTS

| 2006/0028178 A1* | 2/2006 | Hobbs ..................... B60L 8/003 320/128 |
| 2014/0091739 A1 | 4/2014 | Sato et al. |
| 2019/0260225 A1 | 8/2019 | Hida et al. |
| 2021/0296714 A1* | 9/2021 | Yamashita .......... H02J 7/00036 |
| 2021/0367277 A1* | 11/2021 | Takechi ............. H01M 10/482 |

FOREIGN PATENT DOCUMENTS

| CN | 104477046 A | 4/2015 |
| CN | 110045563 A | 7/2019 |
| JP | 09-017460 A | 1/1997 |
| JP | 10-162866 A | 6/1998 |
| JP | 2014-070629 A | 4/2014 |
| JP | 2015-210991 A | 11/2015 |
| JP | 2019-146305 A | 8/2019 |

* cited by examiner

Primary Examiner — Richard Isla
Assistant Examiner — Sadia Kousar
(74) Attorney, Agent, or Firm — Oblon, McClelland, Maier & Neustadt, L.L.P.

(57) ABSTRACT

A battery control device includes: a first identification unit configured to acquire an identification voltage which is output according to a type of a battery from the battery and to identify the type of the battery based on the acquired identification voltage; a second identification unit configured to acquire identification information for identifying the type of the battery from the battery and to identify the type of the battery based on the acquired identification information; and an estimation unit configured to estimate the type of the battery based on an identification result from the first identification unit and an identification result from the second identification unit.

9 Claims, 9 Drawing Sheets

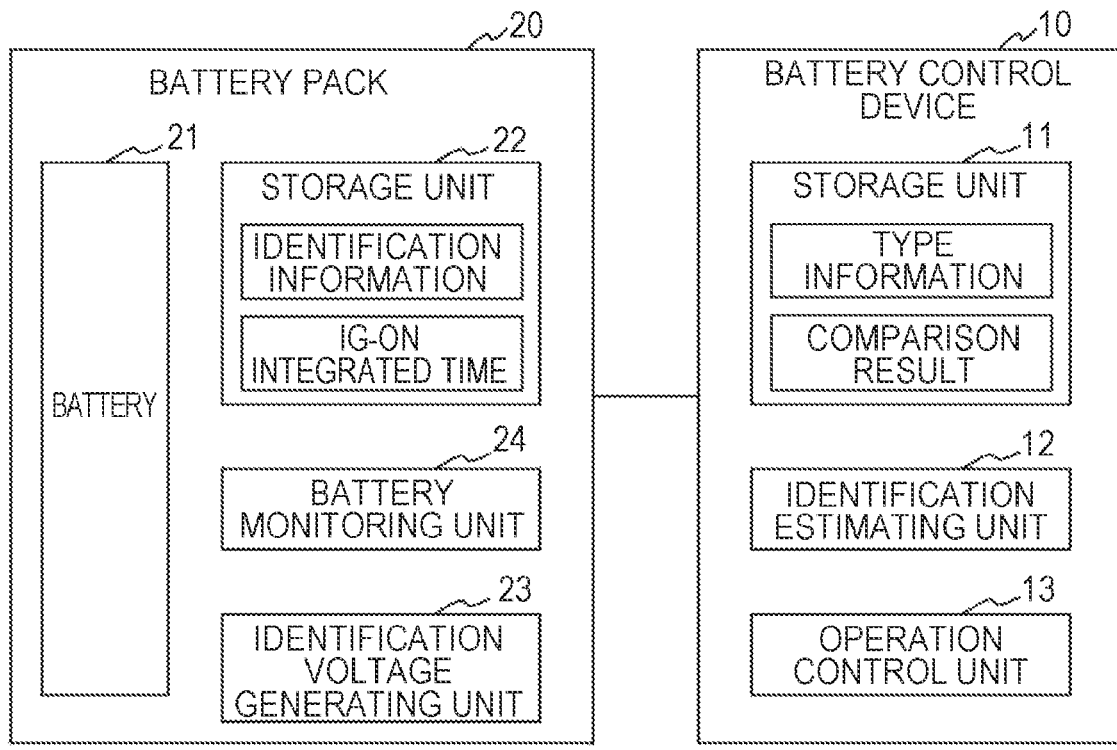

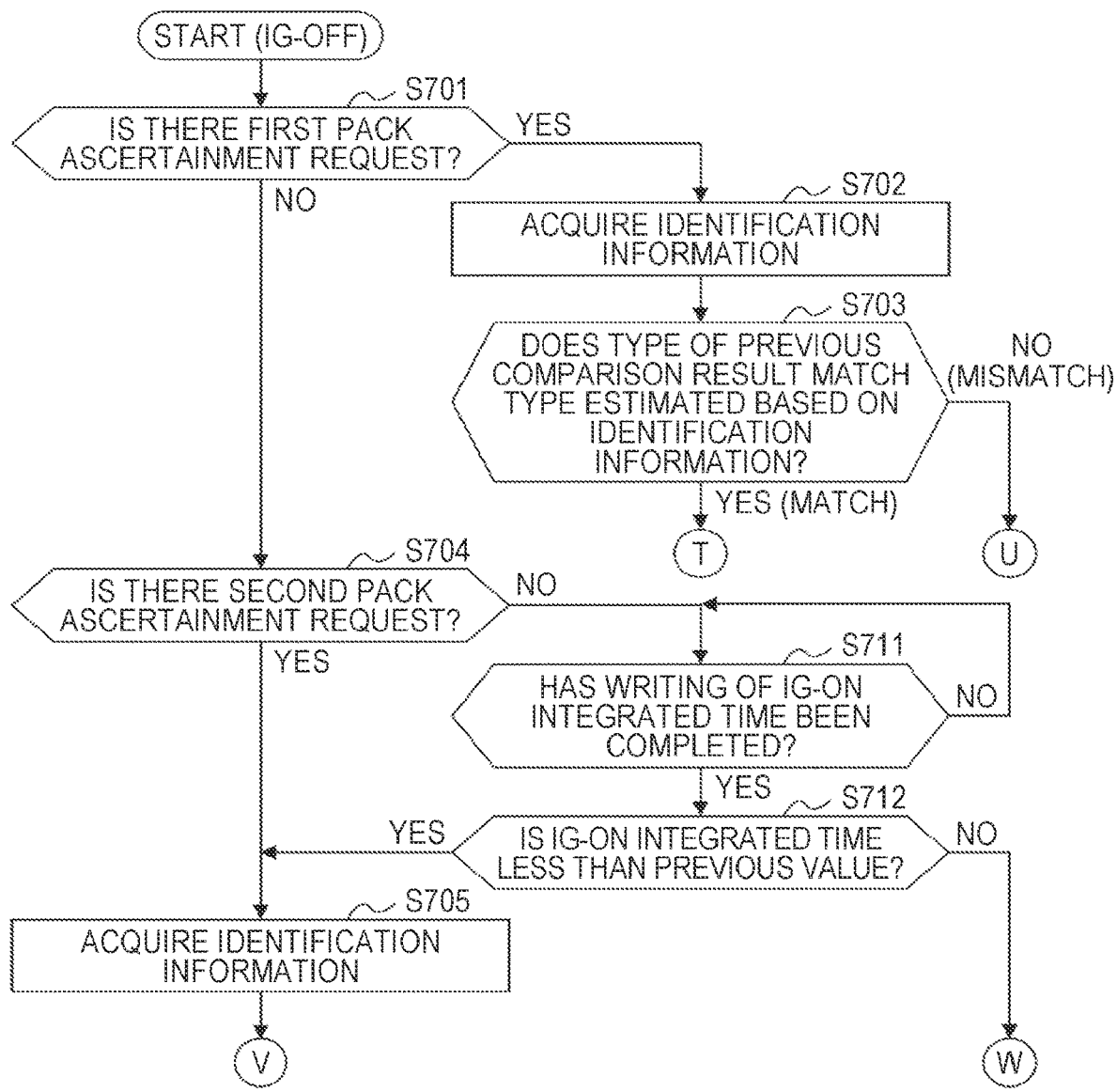

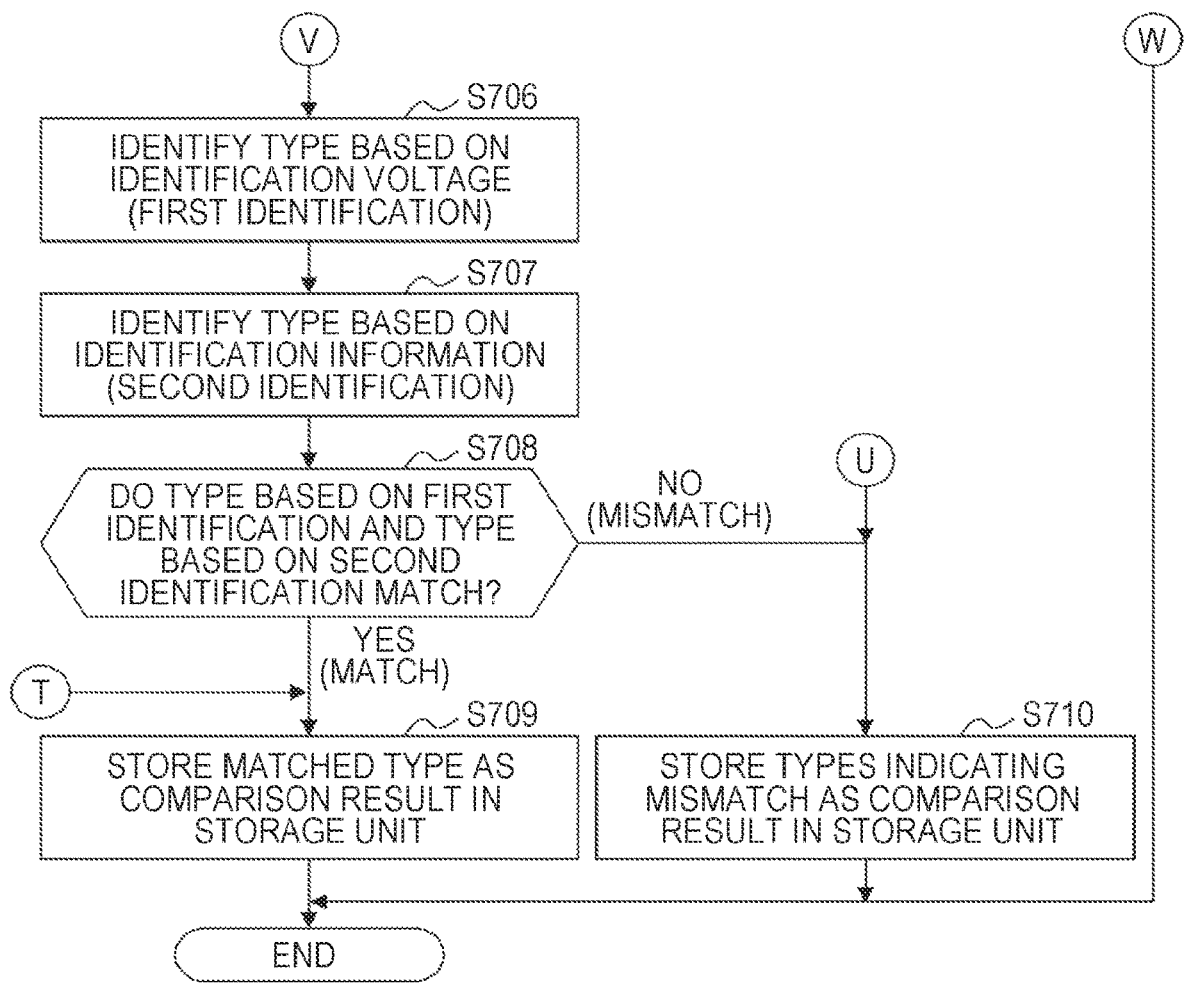

FIG. 8

- BATTERY ESTIMATION CONTROL ACCORDING TO FIRST EXAMPLE, BATTERY ESTIMATION CONTROL ACCORDING TO SECOND EXAMPLE

| | OPERATION | | | PROCESS | | | |
|---|---|---|---|---|---|---|---|
| | BATTERY TYPE | IDENTIFICATION INFORMATION | COMPARISON RESULT | IG-ON | IG-OFF | NEXT IG-ON | ESTIMATION |
| <1> CORRECT COMBINATION | REPLACEMENT CELL A → CELL B | REWRITING CELL A → CELL B | INITIAL VALUE | THERE IS PACK ASCERTAINMENT REQUEST | COMPARISON RESULT ← CELL B | COMPARISON RESULT = IDENTIFICATION INFORMATION | MATCH (CELL B) DETECTION OF COMBINATION: ○ |
| <2> INCORRECT COMBINATION | NON-REPLACEMENT (CELL A) | REWRITING CELL A → CELL B | INITIAL VALUE | THERE IS PACK ASCERTAINMENT REQUEST | COMPARISON RESULT ← CELL A | COMPARISON RESULT ≠ IDENTIFICATION INFORMATION | MISMATCH DETECTION OF COMBINATION: ○ |
| <3> INCORRECT COMBINATION | REPLACEMENT CELL A → CELL B | NON-REWRITING (CELL A) | CELL A | THERE IS NO PACK ASCERTAINMENT REQUEST | COMPARISON RESULT ← CELL A | COMPARISON RESULT = IDENTIFICATION INFORMATION | MATCH (CELL A) DETECTION OF COMBINATION: × |

- BATTERY ESTIMATION CONTROL ACCORDING TO THIRD EXAMPLE

| | OPERATION | | | PROCESS | | | |
|---|---|---|---|---|---|---|---|
| | BATTERY TYPE | IDENTIFICATION INFORMATION | COMPARISON RESULT | IG-ON | IG-OFF | NEXT IG-ON | ESTIMATION |
| <1> CORRECT COMBINATION | REPLACEMENT CELL A → CELL B | REWRITING CELL A → CELL B | INITIAL VALUE | THERE IS FIRST PACK ASCERTAINMENT REQUEST | COMPARISON RESULT ← CELL B | COMPARISON RESULT = IDENTIFICATION INFORMATION | MATCH (CELL B) DETECTION OF COMBINATION: ○ |
| <2> INCORRECT COMBINATION | NON-REPLACEMENT (CELL A) | REWRITING CELL A → CELL B | INITIAL VALUE | THERE IS FIRST PACK ASCERTAINMENT REQUEST | COMPARISON RESULT ← CELL A | COMPARISON RESULT ≠ IDENTIFICATION INFORMATION | MISMATCH DETECTION OF COMBINATION: ○ |
| <3> INCORRECT COMBINATION | REPLACEMENT CELL A → CELL B | NON-REWRITING (CELL A) | CELL A | THERE IS FIRST PACK ASCERTAINMENT REQUEST | COMPARISON RESULT ← CELL B | COMPARISON RESULT ≠ IDENTIFICATION INFORMATION | MISMATCH DETECTION OF COMBINATION: ○ |

BATTERY CONTROL DEVICE, BATTERY CONTROL METHOD, CONTROL PROGRAM, AND VEHICLE

CROSS-REFERENCE TO RELATED APPLICATION

This application claims priority to Japanese Patent Application No. 2020-024334 filed on Feb. 17, 2020 and Japanese Patent Application No. 2020-192459 filed on Nov. 19, 2020 each incorporated herein by reference in its entirety.

BACKGROUND

1. Technical Field

The present disclosure relates to a battery control device that controls a battery, and the like.

2. Description of Related Art

Since performance of a battery deteriorates due to long-term use thereof, there is a system in which a battery is provided in a replaceable manner. In such a system, a type of a battery which is connected thereto is estimated such that an erroneous battery is not connected thereto. For example, Japanese Unexamined Patent Application Publication No. 2015-210991 (JP 2015-210991 A), Japanese Unexamined Patent Application Publication No. 10-162866 (JP 10-162866 A), and Japanese Unexamined Patent Application Publication No. 2014-070629 (JP 2014-070629 A) propose techniques of estimating a type of a battery using characteristics (such as a voltage, a current, an internal resistance, and an SOC) of the battery.

SUMMARY

Characteristics of a battery change for various factors such as a temperature and deterioration of a battery cell. Accordingly, in a method of estimating a type of a battery based on characteristics of a battery, there is concern of erroneous estimation of a type of a battery when there is a plurality of batteries having similar characteristics. Therefore, there is room for further investigation into techniques of estimating a type of a battery.

The present disclosure provides a battery control device and the like that can improve accuracy for estimating a type of a battery.

According to an aspect of the present disclosure, there is provided a battery control device including: a first identification unit configured to acquire an identification voltage which is output according to a type of a battery from the battery and to identify the type of the battery based on the acquired identification voltage; a second identification unit configured to acquire identification information for identifying the type of the battery from the battery and to identify the type of the battery based on the acquired identification information; and an estimation unit configured to estimate the type of the battery based on an identification result from the first identification unit and an identification result from the second identification unit.

According to another aspect of the present disclosure, there is provided a battery control method which is performed by a computer of a battery control device or a control program that is executed by the computer of the battery control device, the battery control method or the control program including: a first step of acquiring an identification voltage which is output according to a type of a battery from the battery and identifying the type of the battery based on the acquired identification voltage; a second step of acquiring identification information for identifying the type of the battery from the battery and identifying the type of the battery based on the acquired identification information; and a third step of estimating the type of the battery based on an identification result of the first step and an identification result of the second step.

With the battery control device and the like according to the present disclosure, since a type of a battery is identified using two different identification methods and the type of the battery is estimated based on the identification results of the two identification methods, it is possible to improve accuracy for estimating the type of the battery.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a functional block diagram of a battery control device according to an embodiment and peripheral parts thereof;

FIG. 2 is a diagram illustrating an example of type information which is stored in the battery control device;

FIG. 7A is a flowchart illustrating a process flow of battery estimation control according to the third example (the second phase) which is performed by the battery control device;

FIG. 7B is a flowchart illustrating a process flow of battery estimation control according to the third example (the second phase) which is performed by the battery control device; and FIG. 8 is a diagram illustrating detectability of combination mismatch due to replacement of a battery through the battery estimation control according to the embodiment.

DETAILED DESCRIPTION OF EMBODIMENTS

Figure 3:
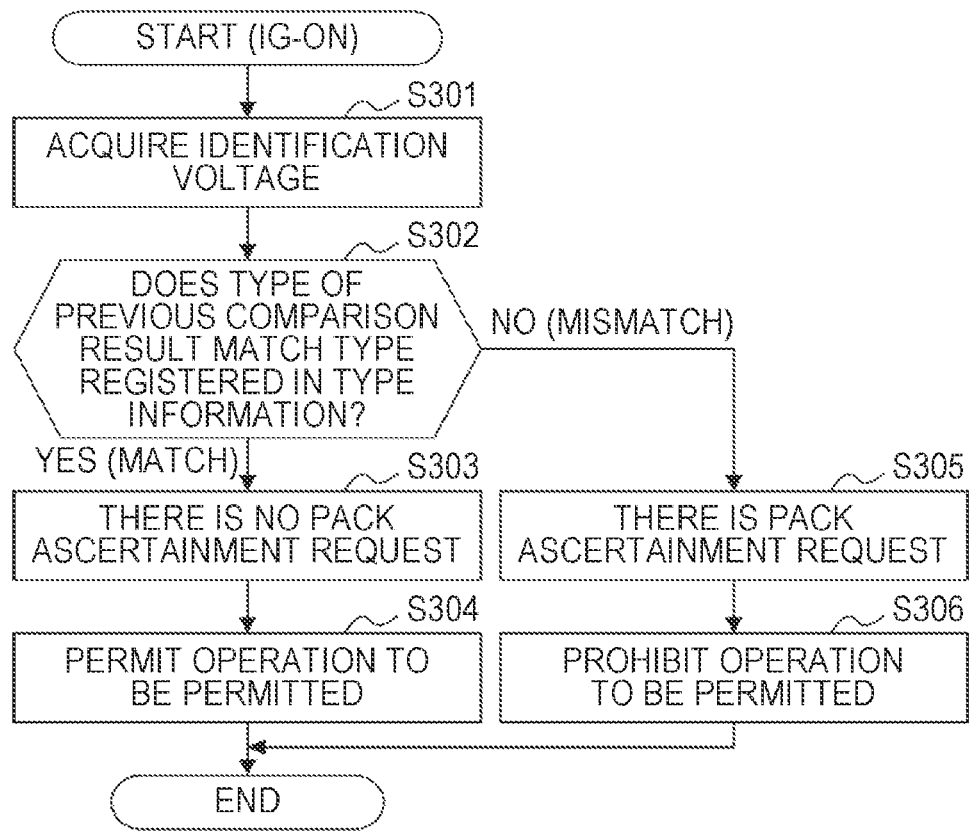
FIG. 3 is a flowchart illustrating a process flow of battery estimation control according to a first example (a first phase) which is performed by the battery control device.

A battery control device according to the present disclosure estimates a type of a battery based on a type of the battery which is identified based on an identification voltage and a type of the battery which is identified based on identification information. Since the type of the battery is estimated based on two or more different identification results in this way, it is possible to improve accuracy for estimating the type of a battery.

The battery control device according to the present disclosure can be mounted, for example, in a vehicle which employs a power supply system with a redundant configuration and which can switch between manual driving and automated driving. Hereinafter, an embodiment of the present disclosure will be described in detail with reference to the accompanying drawings with reference to an example in which the battery control device is mounted in a vehicle which can switch between manual driving and automated driving.

EMBODIMENT

Configuration

FIG. 1 is a functional block diagram of a battery control device 10 according to an embodiment of the present disclosure and peripheral parts thereof. The functional blocks illustrated in FIG. 1 include the battery control device 10 and a battery pack 20. The battery pack 20 is communicatively connected to the battery control device 10 via an onboard network such as a controller area network (CAN) and is controlled by the battery control device 10.

(1) Battery Pack

The battery pack 20 is connected to the battery control device 10 in a detachable manner. The battery pack 20 includes a battery 21, a storage unit 22, an identification voltage generating unit 23, and a battery monitoring unit 24.

The battery 21 is a secondary battery that is configured in a chargeable/dischargeable manner such as a lead storage battery or a lithium-ion battery. The battery 21 can supply electric power stored therein to devices such as an electronic device called an electronic control unit (ECU) (not illustrated) and electrical components under the control of the battery control device 10. When the battery 21 is applied to a vehicle that can switch between manual driving and automated driving, the battery 21 can be used as a sub battery that backs up a main battery at the time of automated driving.

The storage unit 22 stores at least "identification information" and "IG-ON integrated time" as information on batteries 21 which is incorporated into the same battery pack 20. A nonvolatile memory such as an electrically erasable programmable read-only memory (EEPROM) can be used as the storage unit 22.

Identification information is information that can identify a type of the battery 21 and includes a specific value which is given in advance according to the type of the battery 21. The identification information is stored in the storage unit 22 in correlation with the battery 21 which is incorporated at the time of manufacturing the battery pack 20 or the like. For example, an identifier ID can be used as the identification information.

The integrated time is information obtained by cumulatively counting an ignition-on (IG-ON) time (or a READY-ON time) which is a time in which a power supply system of the vehicle is operating in a period from a time point at which the battery pack 20 having the battery 21 incorporated thereinto is mounted in the vehicle to a current time point. For example, the IG-ON integrated time is updated with a new value at an ignition-off (IG-OFF) time point (or a READY-OFF time point) at which the power supply system is stopped.

The identification voltage generating unit 23 is a constituent unit that generates an identification voltage which is output according to the type of the battery 21. The identification voltage is information that can identify the type of the battery 21 and is a voltage value which is preset according to the type of the battery 21. Typically, a voltage divider circuit that generates an identification voltage by dividing a predetermined supply voltage using a plurality of resistive elements is used as the identification voltage generating unit 23. Accordingly, the identification voltage is set to be in a voltage range in which the type of the battery 21 is not erroneously determined in the battery control device 10 in consideration of an abnormality which may occur in the identification voltage generating unit 23. An example for setting the identification voltage will be described below.

An example of an identification voltage which is set to identify two types of batteries 21 when a supply voltage is 4.5 V and an open-circuit voltage of detection terminals for detecting the identification voltage in the battery monitoring unit 24 which will be described later is 1.5 V will be described below. First, an abnormality in which a voltage-divided output of the identification voltage generating unit 23 is not input to the detection terminals of the battery monitoring unit 24 is assumed to have occurred, and, for example, an "open-circuit voltage 1.5 V±0.2 V" including a margin of a detection error is excluded from the set range. Then, an abnormality in which the voltage-divided output of the identification voltage generating unit 23 is short-circuited to the supply voltage is assumed to have occurred, and, for example, an "supply voltage 4.5 V+0.5 V" including a margin of a detection error is excluded from the set range. Then, an abnormality in which the voltage-divided output of the identification voltage generating unit 23 is short-circuited to a ground voltage is assumed to have occurred, and, for example, a "ground voltage 0 V–0.5 V" including a margin of a detection error is excluded from the set range. An identification voltage for identifying two types of batteries 21 is set using the non-excluded set ranges "0.5 V to 1.3 V and 1.7 V to 4.0 V." For example, an identification voltage for a first type of battery 21 may be set to "2.2 V±0.5 V" and an identification voltage for a second type of battery 21 may be set to "3.45 V±0.5 V." When this setting has been completed and a certain abnormality has occurred in the identification voltage generating unit 23, it is possible to avoid erroneous determination of a type of a battery 21 in the battery control device 10.

The battery monitoring unit 24 monitors a state of the battery 21 (such as a voltage, a current, and a temperature). The battery monitoring unit 24 can read identification information or an IG-ON integrated time from the storage unit 22 or update the IG-ON integrated time stored in the storage unit 22. The battery monitoring unit 24 can acquire an identification voltage which is output from the identification voltage generating unit 23. Typically, the battery monitoring unit 24 can be configured as a circuit (IC) in which functions such as an acquisition unit configured to acquire the voltage, the current, and the temperature of the battery 21 detected by various sensors (not illustrated), an AD converter that acquires the identification voltage from the identification voltage generating unit 23 via an AD port, and a communication unit configured to communicate with the battery control device 10 via a communication port are integrated. The state, the identification voltage, the identification information, the IG-ON integrated time, and the like of the battery 21 are transmitted from the battery monitoring unit 24 to the battery control device 10.

(2) Battery Control Device

The battery control device 10 is an electronic device that takes charge of control of the battery pack 20. The battery control device 10 is typically configured as an ECU (or a DCDC converter) including a processor such as a microcomputer, a memory, and input/output interfaces, and realizes the functions of a storage unit 11, an identification estimating unit 12, and an operation control unit 13 which will be described later by causing the processor to read and execute a program stored in the memory.

The storage unit 11 stores at least "type information" and "comparison results" as information on the battery pack 20 which can be connected to the battery control device 10.

The type information is information which is used for a comparison process of determining whether the battery pack 20 connected to the battery control device 10 is a predetermined regular battery pack. The type information is information in which one or more types of batteries 21 which are incorporated into a regular battery pack to be controlled are registered and in which identification information and an identification voltage are correlated with each registered type. An example of the type information is illustrated in FIG. 2.

In the type information illustrated in FIG. 2, a regular battery pack to be controlled by the battery control device 10 is a battery pack in which a battery 21 corresponding to one of Type a and Type b is incorporated. The battery pack 20 in which a battery 21 of Type a is incorporated has "ID000a" assigned thereto as identification information and is set such that an identification voltage in a range "$Va \pm a1$" is output therefrom. The battery pack 20 in which a battery 21 of Type b is incorporated has "ID000b" assigned thereto as identification information and is set such that an identification voltage in a range "$Vb \pm b1$" is output. In the type information, an "operation to be permitted" which is an operation which is permitted at the time of connection of a regular battery pack can be prescribed. In the example illustrated in FIG. 2, when the battery pack 20 in which a battery 21 of Type a or Type b is incorporated is connected to the battery control device 10, a first operation is prescribed to be permitted for the vehicle. The types or numbers of batteries 21 incorporated into a regular battery pack 20 and the number or content of operations to be permitted corresponding to each type are not limited to the example illustrated in FIG. 2.

The comparison results are results of a comparison process which is performed by the identification estimating unit 12 which will be described later. Typically, the comparison results are a type of a battery. The comparison results are updated whenever comparison is performed by the identification estimating unit 12.

The storage unit 11 can be divisionally configured as a nonvolatile memory such as a read-only memory (ROM) in which the type information is stored and a volatile memory such as a static random access memory (SRAM) in which the comparison results are stored.

The identification estimating unit 12 has functions of a first identification unit, a second identification unit, and an estimation unit, and performs a comparison process of identifying a type of a battery pack 20 which is connected to the battery control device 10 and estimating whether the battery pack 20 is a regular battery pack based on the identified type. Then, the estimation unit of the identification estimating unit 12 estimates the type of the battery pack 20 based on an identification result through first identification which is performed by the first identification unit and an identification result through second identification which is performed by the second identification unit, which will be described later.

The first identification performed by the first identification unit is a method of acquiring an identification voltage which is generated by the identification voltage generating unit 23 from the battery pack 20 connected to the battery control device 10 and identifying a type of a battery 21 corresponding to the acquired identification voltage based on the type information stored in the storage unit 11. For example, in the example illustrated in FIG. 2, when the identification voltage acquired from the battery pack 20 is "Va," the type of the battery 21 incorporated in the battery pack 20 is identified to be "a."

The second identification performed by the second identification unit is a method of acquiring (reading) identification information stored in the storage unit 22 from the battery pack 20 connected to the battery control device 10 and identifying a type of a battery 21 corresponding to the acquired identification information based on the type information stored in the storage unit 11. For example, in the example illustrated in FIG. 2, when the identification information acquired from the battery pack 20 is "ID000a," the type of the battery 21 incorporated in the battery pack 20 is identified to be "a."

The operation control unit 13 controls whether a predetermined operation to be permitted is to be performed based on the type of the battery 21 which is an estimation result based on identification and comparison which are performed by the identification estimating unit 12 (an estimation result from the estimation unit) and the type information which is stored in the storage unit 11. For example, in the example illustrated in FIG. 2, execution of a first operation is permitted when the type of the battery 21 estimated by the identification estimating unit 12 is "a" or "b," and execution of the first operation is not permitted (is prohibited) when the type of the battery 21 is neither "a" nor "b." The first operation may be, for example, an operation of transitioning from manual driving to automated driving when the battery control device 10 is applied to a vehicle which can switch between manual driving and automated driving.

The operation control unit 13 serves as a determination unit that can determine whether the battery pack 20 has been replaced. This determination is performed using the IG-ON integrated time which is stored in the storage unit 22 of the battery pack 20. In general, when a battery pack 20 is continuously used without being replaced, an operation time of a power supply system of a vehicle is integrated and thus the IG-ON integrated time increases necessarily from a previous value. However, when the battery pack 20 is replaced with a new product at a certain time point, the IG-ON integrated time of the new battery pack 20 is zero and thus the IG-ON integrated time of the new battery pack 20 decreases from the previous value (the IG-ON integrated time of the battery pack 20 before being replaced) as long as the power supply system is not caused to operate continuously for the IG-ON integrated time of the battery pack 20 or more before being replaced. Accordingly, the operation control unit 13 determines whether the battery pack 20 has been replaced by determining whether a decrease of the IG-ON integrated time has occurred.

Control

Battery estimation control of estimating a type of a battery 21 incorporated in the battery pack 20 which is performed by the battery control device 10 according to this embodiment will be described below with further reference to FIGS. 3, 4, 5A, 5B, 6, 7A, and 7B.

(1) Battery Estimation Control According to First Example

Figure 4:
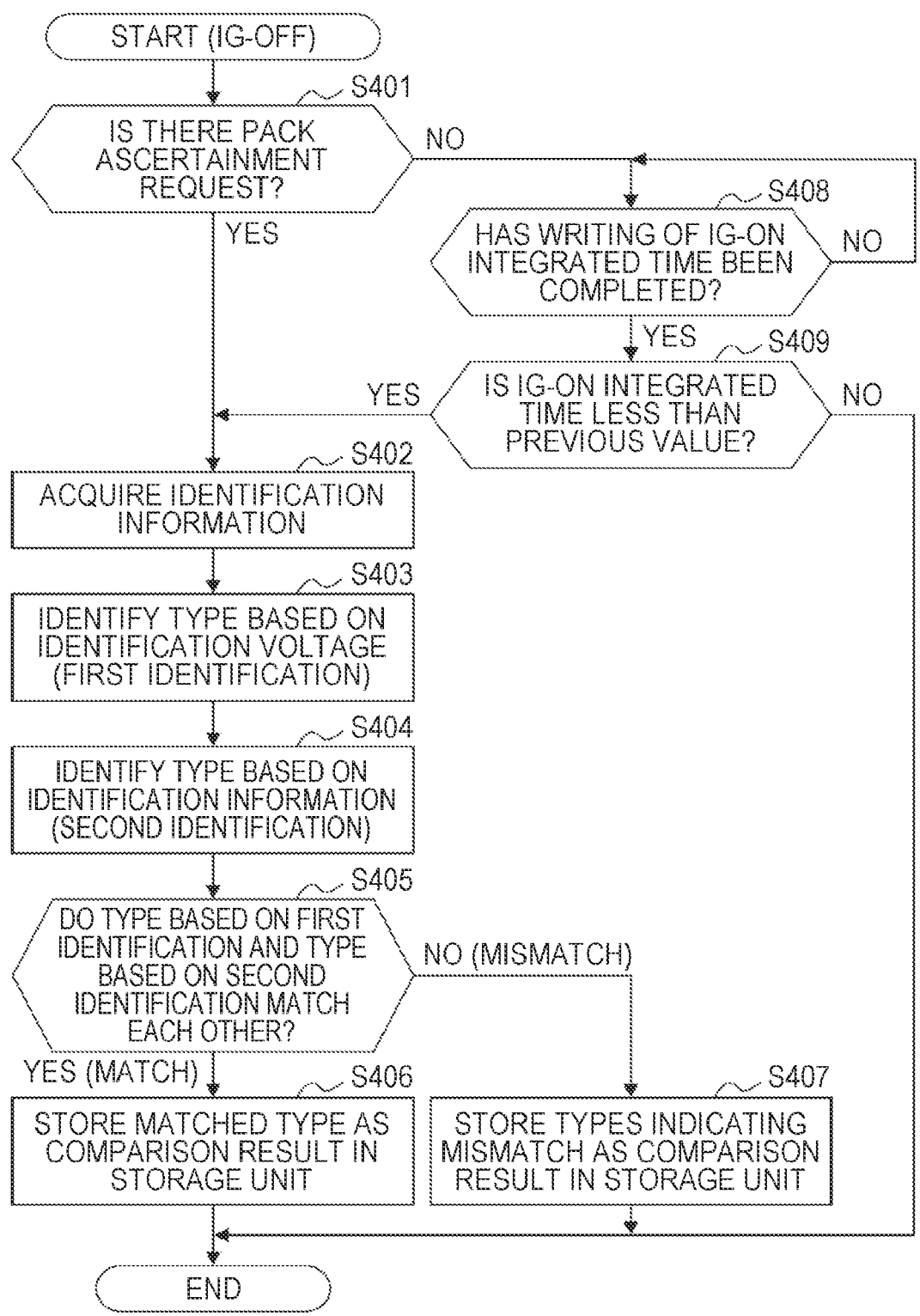
FIG. 4 is a flowchart illustrating a process flow of battery estimation control according to a second example (a second phase) which is performed by the battery control device.

FIGS. 3 and 4 are flowcharts illustrating a process flow of battery estimation control according to a first example. In the first example, battery estimation control is performed in two phases.

FIG. 3 will be referred to first in the description below. A first phase of battery estimation control illustrated in FIG. 3 is started when the power supply system of the vehicle is turned on (such as IG-ON or READY-ON) and the vehicle operates. Immediately after the battery estimation control has been started, an operation to be permitted (for example, a first operation of transitioning from manual driving to automated driving) is prohibited.

Step S301: The identification estimating unit 12 of the battery control device 10 acquires an identification voltage which is generated by the identification voltage generating unit 23 of the battery pack 20 via the battery monitoring unit 24. The acquired identification voltage is stored in the storage unit 11. When the identification voltage is acquired, the process flow proceeds to Step S302.

Step S302: The identification estimating unit 12 of the battery control device 10 compares a type of a battery 21 which is stored as a previous comparison result in the storage unit 11 with a type which is registered in the type information stored in the storage unit 11 and determines whether the types match. When no previous comparison result is stored in the storage unit 11 yet, such as when this battery estimation control is performed for the first time, it is determined that the types do not match. The process flow proceeds to Step S303 when the types match (S302: YES), and the process flow proceeds to Step S305 when the types do not match (S302: NO).

Step S303: The identification estimating unit 12 of the battery control device 10 sets a "pack ascertainment request" for requesting ascertainment of whether the battery pack 20 has been replaced to "no." This setting can be performed, for example, by not setting up a predetermined request flag. When the pack ascertainment request is set to no, the process flow proceeds to Step S304.

Step S304: The operation control unit 13 of the battery control device 10 permits an operation to be permitted. When the operation to be permitted is permitted, the first phase of the battery estimation control of the first example ends.

Step S305: The identification estimating unit 12 of the battery control device 10 sets the "pack ascertainment request" for requesting ascertainment of whether the battery pack 20 has been replaced to "yes." This setting can be performed, for example, by setting up a predetermined request flag. When the pack ascertainment request is set to yes, the process flow proceeds to Step S306.

Step S306: The operation control unit 13 of the battery control device 10 prohibits the operation to be permitted. When the operation to be permitted is prohibited, the battery pack 20 (or the battery 21) may be electrically separated from the battery control device 10. When the operation to be permitted is prohibited, the first phase of the battery estimation control of the first example ends.

FIG. 4 will be referred to next. A second phase of battery estimation control illustrated in FIG. 4 is started when the power supply system of the vehicle is turned off (such as IG-OFF or READY-OFF) and the vehicle stops.

Step S401: The identification estimating unit 12 of the battery control device 10 determines which of yes and no is set for the pack ascertainment request. This determination is performed to determine whether comparison of the type of the battery 21 is to be performed in the second phase. The process flow proceeds to Step S402 when the pack ascertainment request is set to yes (S401: YES), and the process flow proceeds to Step S408 when the pack ascertainment request is set to no (S401: NO).

Step S402: The identification estimating unit 12 of the battery control device 10 acquires (reads) identification information stored in the storage unit 22 of the battery pack 20 via the battery monitoring unit 24. When the identification information is acquired, the process flow proceeds to Step S403.

Step S403: The identification estimating unit 12 of the battery control device 10 identifies the type of the battery 21 which is incorporated in the battery pack 20 based on the identification voltage acquired from the battery pack 20 (first identification). Specifically, the identification estimating unit 12 identifies the type of the battery 21 by identifying the type corresponding to the identification voltage based on the type information stored in the storage unit 11. Hereinafter, the type of the battery 21 which is identified based on the identification voltage is referred to as a "type based on first identification." When a type based on first identification is acquired as the identification result, the process flow proceeds to Step S404.

Step S404: The identification estimating unit 12 of the battery control device 10 identifies a type of the battery 21 which is incorporated in the battery pack 20 based on the identification information acquired from the battery pack 20 (second identification). Specifically, the identification estimating unit 12 identifies the type of the battery 21 by identifying the type corresponding to the identification information based on the type information stored in the storage unit 11. Hereinafter, the type of the battery 21 which is identified based on the identification information is referred to as a "type based on second identification." When a type based on second identification is acquired as the identification result, the process flow proceeds to Step S405.

Step S405: The identification estimating unit 12 of the battery control device 10 compares the type based on first identification (an identification result of the first identification) and the type based on second identification (an identification result of the second identification) which are stored in the storage unit 11 and determines whether the types (identification results) match. The process flow proceeds to Step S406 when the type based on first identification and the type based on second identification match (S405: YES), and the process flow proceeds to Step S407 when the type based on first identification and the type based on second identification do not match (S405: NO).

Step S406: Since the type based on first identification and the type based on second identification match, the identification estimating unit 12 of the battery control device 10 stores the matched type of the battery 21 as a comparison result in the storage unit 11. When the comparison result is stored in the storage unit 11, the second phase of the battery estimation control of the first example ends.

Step S407: Since the type based on first identification and the type based on second identification do not match, the identification estimating unit 12 of the battery control device 10 stores a predetermined type indicating mismatch or unclearness as a comparison result in the storage unit 11. For example, a predetermined type which does not correspond to any battery 21 incorporated in the battery pack 20 which can be connected to the battery control device 10 is used as the type indicating mismatch or unclearness. When the type information is the example illustrated in FIG. 2, Type "c" can be stored as the comparison result. The fact that the types do not match may be notified of to the outside by displaying text, outputting a voice, or the like. When the comparison result is stored in the storage unit 11, the second phase of the battery estimation control of the first example ends.

Step S408: The operation control unit 13 of the battery control device 10 determines whether writing of the IG-ON integrated time obtained by integrating an ignition-on time of the vehicle to the storage unit 22 has been completed in the battery pack 20. The process flow proceeds to Step S409 when writing of the IG-ON integrated time has been completed (S408: YES), and the determination of Step S408 is continuously performed until writing has been completed when writing of the IG-ON integrated time has not been completed (S408: NO).

Step S409: The operation control unit 13 of the battery control device 10 reads the IG-ON integrated time from the storage unit 22 of the battery pack 20 and determines whether the currently read IG-ON integrated time (a current value) is less than the previously read IG-ON integrated time (a previous value). The IG-ON integrated time (the previous value) can be stored in the battery control device 10 (the storage unit 11 or the like thereof) until the IG-ON integrated time (the current value) is newly read from the battery pack 20. The process flow proceeds to Step S402 when the current value of the IG-ON integrated time is less than the previous value (S409: YES), and the second phase of the battery estimation control of the first example ends when the current value of the IG-ON integrated time is not less than the previous value (S409: NO).

The battery estimation control of the first example is suitable, for example, in a case of specifications in which the battery control device 10 can access the storage unit 22 of the battery pack 20 only in a period in which the power supply system of the vehicle is stopped. When the power supply system is turned off (the second phase), the battery control device 10 acquires identification information from the storage unit 22 and stores a comparison result between the type based on first identification and the type based on second identification in the storage unit 11 in advance. Accordingly, the next time the power supply system is turned on (the first phase), the battery control device 10 can estimate the type of the battery 21 by rapidly reading the comparison result from the storage unit 11 and performing comparison with the type information. Accordingly, in the battery estimation control of the first example, the A/D conversion process or the communication process by the battery monitoring unit 24 and the identification process by the identification estimating unit 12 do not need to be performed with every starting of the power supply system and it is possible to prevent delay of a time (a first start time) from a time point at which the power supply system has been started to a time point at which the identification estimating unit 12 estimates the type of the battery 21.

With the battery estimation control of the first example, comparison and match between the matched type and a type registered in advance in the type information is determined in addition to comparison and match between the type based on first identification and the type based on second identification. Accordingly, even when malfunction, failure (for example, unevenness in A/D value), or the like occurs in a component associated with one of the identification voltage and the identification information, it is possible to prevent the type of the battery 21 from being erroneously estimated.

(2) Battery Estimation Control According to Second Example

Figure 5A:
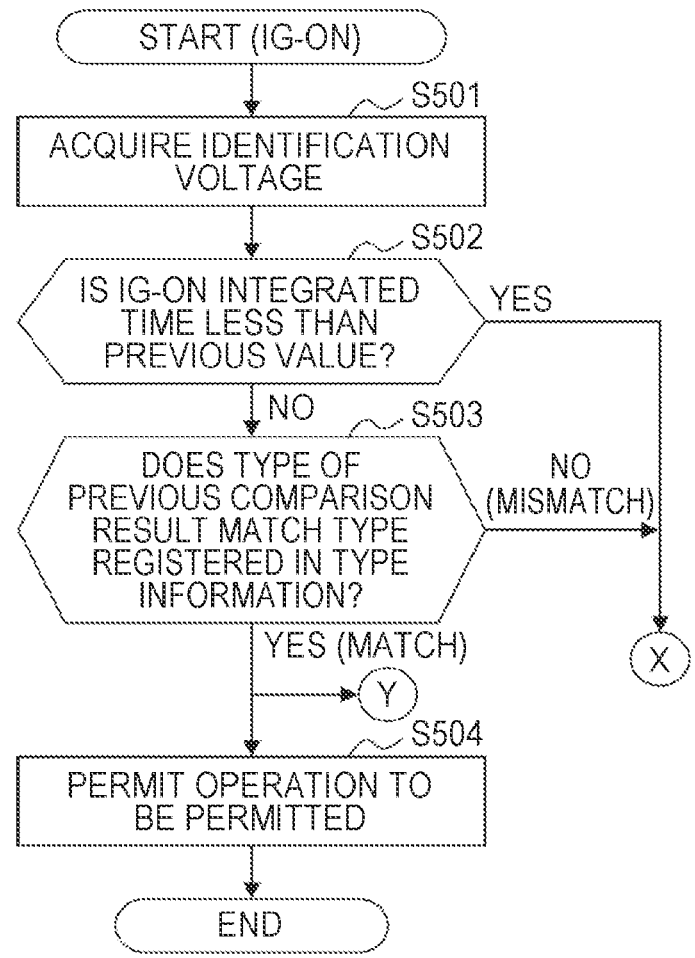
FIG. 5A is a flowchart illustrating a process flow of battery estimation control according to the second example which is performed by the battery control device.
Figure 5B:
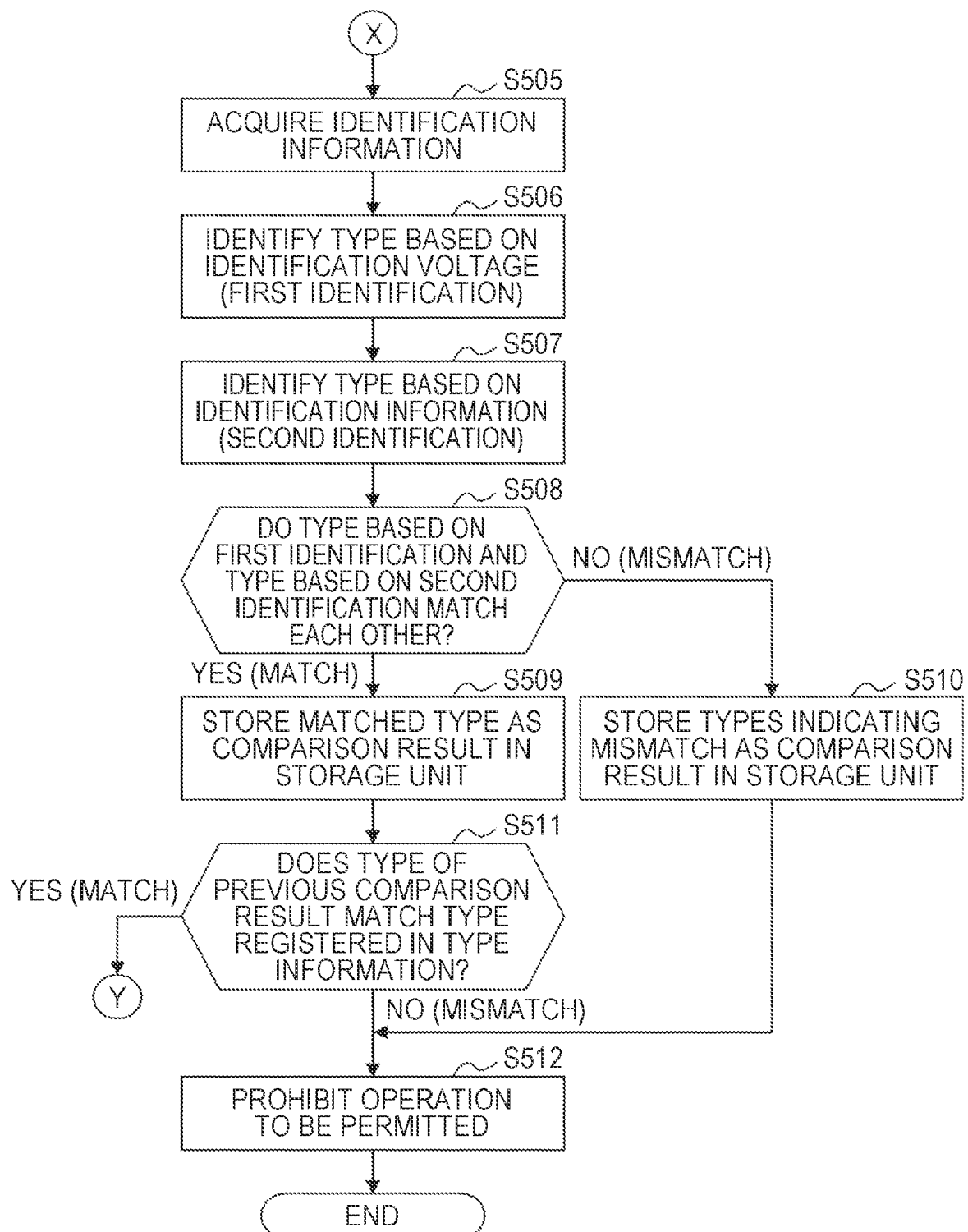
FIG. 5B is a flowchart illustrating a process flow of battery estimation control according to the second example which is performed by the battery control device.

FIGS. 5A and 5B are flowcharts illustrating a process flow of battery estimation control according to a second example. In the second example, battery estimation control is performed in a single phase. The process flow illustrated in FIG. 5A and the process flow illustrated in FIG. 5B are connected by connectors X and Y.

FIGS. 5A and 5B will be referred to in the description below. The battery estimation control illustrated in FIGS. 5A and 5B is started when the power supply system of the vehicle is turned on (such as IG-ON or READY-ON) and the vehicle operates. Immediately after the battery estimation control has been started, an operation to be permitted (for example, a first operation of transitioning from manual driving to automated driving) is prohibited.

Step S501: The identification estimating unit 12 of the battery control device 10 acquires an identification voltage which is generated by the identification voltage generating unit 23 of the battery pack 20 via the battery monitoring unit 24. The acquired identification voltage is stored in the storage unit 11. When the identification voltage is acquired, the process flow proceeds to Step S502.

Step S502: The operation control unit 13 of the battery control device 10 reads an IG-ON integrated time from the storage unit 22 of the battery pack 20 and determines whether the currently read IG-ON integrated time (the current value) is less than the previously read IG-ON integrated time (the previous value). The process flow proceeds to Step S505 when the current value of the IG-ON integrated time is less than the previous value (S502: YES), and the process flow proceeds to Step S503 when the current value of the IG-ON integrated time is not less than the previous value (S502: NO).

Step S503: The identification estimating unit 12 of the battery control device 10 compares a type of a battery 21 which is stored as previous comparison results in the storage unit 11 with a type which is registered in the type information stored in the storage unit 11 and determines whether both types match each other. When the previous comparison results are not stored yet in the storage unit 11 such as when the battery estimation control is performed for the first time, it is determined that both types do not match each other. The process flow proceeds to Step S504 when both types match each other (S503: YES), and the process flow proceeds to Step S505 when both types do not match each other (S503: NO).

Step S504: The operation control unit 13 of the battery control device 10 permits an operation to be permitted. When the operation to be permitted is permitted, the battery estimation control of the second example ends.

Step S505: The identification estimating unit 12 of the battery control device 10 acquires (reads) the identification information stored in the storage unit 22 of the battery pack 20 via the battery monitoring unit 24. When the identification information is acquired, the process flow proceeds to Step S506.

Step S506: The identification estimating unit 12 of the battery control device 10 identifies the type of the battery 21 which is incorporated in the battery pack 20 based on the identification voltage acquired from the battery pack 20 (first identification). When the type of the battery 21 which is identified based on the identification voltage (the type based on first identification) is acquired as the identification result, the process flow proceeds to Step S507.

Step S507: The identification estimating unit 12 of the battery control device 10 identifies the type of the battery 21 which is incorporated in the battery pack 20 based on the identification information acquired from the battery pack 20 (second identification). When the type of the battery 21 which is identified based on the identification information (the type based on second identification) is acquired as the identification result, the process flow proceeds to Step S508.

Step S508: The identification estimating unit 12 of the battery control device 10 compares the type based on first identification (an identification result of the first identification) and the type based on second identification (an identification result of the second identification) which are stored in the storage unit 11 and determines whether both types (identification results) match each other. The process flow proceeds to Step S509 when the type based on first identification and the type based on second identification match each other (S508: YES), and the process flow proceeds to Step S510 when the type based on first identification and the type based on second identification do not match each other (S508: NO).

Step S509: Since the type based on first identification and the type based on second identification match each other, the identification estimating unit 12 of the battery control device 10 stores the matched type of the battery 21 as a comparison result in the storage unit 11. When the comparison result is stored in the storage unit 11, the process flow proceeds to Step S511.

Step S510: Since the type based on first identification and the type based on second identification do not match each other, the identification estimating unit 12 of the battery control device 10 stores a predetermined type indicating mismatch or unclearness as a comparison result in the storage unit 11. For example, a predetermined type which does not correspond to any battery 21 incorporated in the battery pack 20 which can be connected to the battery control device 10 is used as the type indicating mismatch or unclearness. When the comparison result is stored in the storage unit 11, the process flow proceeds to Step S512.

Step S511: The identification estimating unit 12 of the battery control device 10 compares the type of the battery 21 stored as previous comparison results in the storage unit 11 with the type registered in the type information stored in the storage unit 11 and determines whether both types match each other. The process flow proceeds to Step S504 when both types match each other (S511: YES), and the process flow proceeds to Step S512 when both types do not match each other (S511: NO).

Step S512: The operation control unit 13 of the battery control device 10 prohibits the operation to be permitted. When the operation to be permitted is prohibited, the battery pack 20 (or the battery 21) may be electrically separated from the battery control device 10. When the operation to be permitted is prohibited, the battery estimation control of the second example ends.

The battery estimation control of the second example is suitable, for example, in a case of specifications in which the battery control device 10 can access the storage unit 22 of the battery pack 20 regardless of the state of the power supply system of the vehicle. When the power supply system is previously turned on, the battery control device 10 stores the comparison result between the type based on first identification and the type based on second identification in the storage unit 11 in advance. Accordingly, when the power supply system is turned on in the next time, the battery control device 10 can estimate the type of the battery 21 by rapidly reading the comparison result from the storage unit 11 and performing comparison with the type information. Accordingly, in the battery estimation control of the second example, the A/D conversion process or the communication process by the battery monitoring unit 24 and the identification process by the identification estimating unit 12 do not need to be performed every starting of the power supply system and it is possible to prevent delay of a time (a first start time) from a time point at which the power supply system has been started to a time point at which the identification estimating unit 12 estimates the type of the battery 21.

(3) Battery Estimation Control According to Third Example

The battery estimation control according to the first and second examples is control based on the premise that the battery pack 20 is detached from the vehicle and the comparison result stored in the storage unit 11 (an SRAM or the like) of the battery control device 10 is reset (cleared) at the time of replacement of the battery 21. On the other hand, battery estimation control according to a third example is control based on the assumption that the battery pack 21 is replaced without detaching the battery 20 from the vehicle, that is, that the comparison result stored in the storage unit 11 of the battery control device 10 is not reset.

Figure 6:
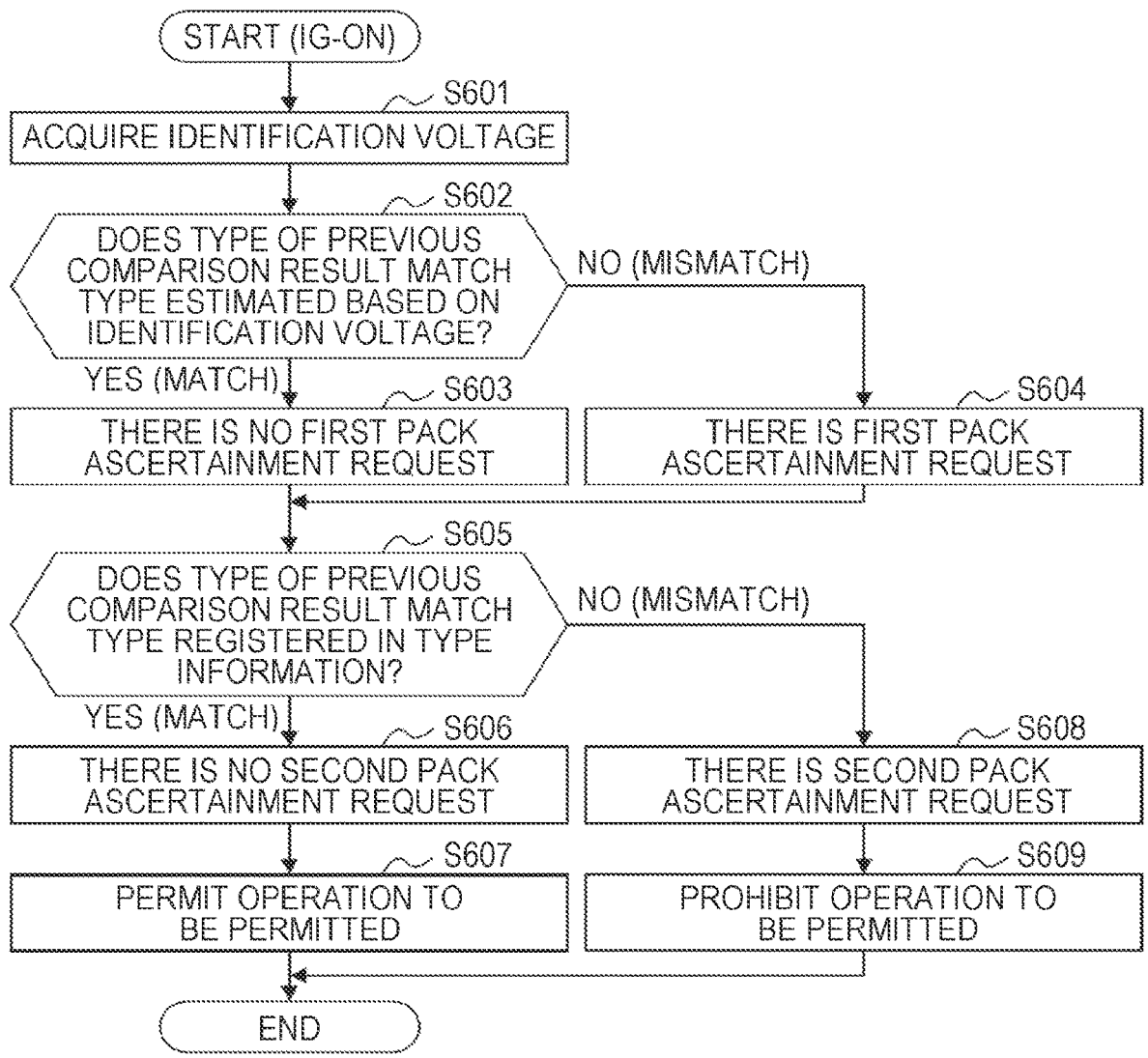
FIG. 6 is a flowchart illustrating a process flow of battery estimation control according to a third example (the first phase) which is performed by the battery control device.

FIGS. 6, 7A, and 7B are flowcharts illustrating a process flow of battery estimation control according to the third example. In the third example, battery estimation control is performed in two phases. The process flow illustrated in FIG. 7A and the process flow illustrated in FIG. 7B are connected by connectors T, U, V, and W.

FIG. 6 will be referred to first in the description below. A first phase of battery estimation control illustrated in FIG. 6 is started when the power supply system of the vehicle is turned on (such as IG-ON or READY-ON) and the vehicle operates. Immediately after the battery estimation control has been started, an operation to be permitted (for example, a first operation of transitioning from manual driving to automated driving) is prohibited.

Step S601: The identification estimating unit 12 of the battery control device 10 acquires an identification voltage which is generated by the identification voltage generating unit 23 of the battery pack 20 via the battery monitoring unit 24. The acquired identification voltage is stored in the storage unit 11. When the identification voltage is acquired, the process flow proceeds to Step S602.

Step S602: The identification estimating unit 12 of the battery control device 10 compares a type of a battery 21 which is stored as a previous comparison result in the storage unit 11 with a type of the battery 21 which is estimated based on the identification voltage acquired in Step S601, and determines whether the two types match. Estimation of the type of the battery 21 based on the identification voltage can be performed by identifying the type corresponding to the identification voltage based on the type information stored in the storage unit 11. The process flow proceeds to Step S603 when the two types match (S602: YES), and the process flow proceeds to Step S604 when the two types do not match (S602: NO).

Step S603: The identification estimating unit 12 of the battery control device 10 sets a "first pack ascertainment request" for requesting ascertainment of whether the battery pack 20 has been replaced to "NO." This setting can be performed, for example, by not setting up a predetermined request flag. When the first pack ascertainment request is set to NO, the process flow proceeds to Step S605.

Step S604: The identification estimating unit 12 of the battery control device 10 sets the "first pack ascertainment request" for requesting ascertainment of whether the battery pack 20 has been replaced to "YES." This setting can be performed, for example, by setting up the predetermined request flag. When the first pack ascertainment request is set to YES, the process flow proceeds to Step S605.

Step S605: The identification estimating unit 12 of the battery control device 10 compares the type of the battery 21 which is stored as the previous comparison result in the storage unit 11 with the type of the battery 21 which is registered in the type information stored in the storage unit 11, and determines whether the two types match. When the previous comparison result is not yet stored in the storage unit 11 such as when the battery estimation control is performed for the first time, it is determined that the two types do not match. The process flow proceeds to Step S606 when the two types match (S605: YES), and the process flow proceeds to Step S608 when the two types do not match (S605: NO).

Step S606: The identification estimating unit 12 of the battery control device 10 sets a "second pack ascertainment request" for requesting ascertainment of whether the battery pack 20 has been replaced, which is different from the first pack ascertainment request, to "NO." This setting can be performed, for example, by not setting up a predetermined request flag. When the second pack ascertainment request is set to NO, the process flow proceeds to Step S607.

Step S607: The operation control unit 13 of the battery control device 10 permits an operation to be permitted. When the operation to be permitted is permitted, the first phase of the battery estimation control according to the third example ends.

Step S608: The identification estimating unit 12 of the battery control device 10 sets the "second pack ascertainment request" for requesting ascertainment of whether the battery pack 20 has been replaced, which is different from the first pack ascertainment request, to "YES." This setting can be performed, for example, by setting up a predetermined request flag. When the second pack ascertainment request is set to YES, the process flow proceeds to Step S609.

Step S609: The operation control unit 13 of the battery control device 10 prohibits the operation to be permitted. When the operation to be permitted is prohibited, the battery pack 20 (or the battery 21) may be electrically separated from the battery control device 10. When the operation to be permitted is prohibited, the first phase of the battery estimation control according to the third example ends.

FIGS. 7A and 7B will be referred to in the description below. A second phase of the battery estimation control illustrated in FIGS. 7A and 7B is started when the power supply system of the vehicle is turned off (such as IG-OFF or READY-OFF) and the vehicle stops.

Step S701: The identification estimating unit 12 of the battery control device 10 determines which of YES and NO is set for the first pack ascertainment request. This determination is performed to determine whether comparison of the type of the battery 21 is to be performed in the second phase. The process flow proceeds to Step S702 when the first pack ascertainment request is set to YES (S701: YES), and the process flow proceeds to Step S704 when the first pack ascertainment request is set to NO (S701: NO).

Step S702: The identification estimating unit 12 of the battery control device 10 acquires (reads) identification information stored in the storage unit 22 of the battery pack 20 via the battery monitoring unit 24. When the identification information is acquired, the process flow proceeds to Step S703.

Step S703: The identification estimating unit 12 of the battery control device 10 compares the type of the battery 21 which is stored as the previous comparison result in the storage unit 11 with the type of the battery 21 which is estimated based on the identification information acquired in Step S702, and determines whether the two types match. Determination of the type of the battery 21 based on the identification information can be performed by identifying the type corresponding to the identification information based on the type information stored in the storage unit 11. The process flow proceeds to Step S709 when the two types match (S703: YES), and the process flow proceeds to Step S710 when the two types do not match (S703: NO).

Step S704: The identification estimating unit 12 of the battery control device 10 determines which of YES and NO is set for the second pack ascertainment request. This determination is performed to determine whether comparison of the type of the battery 21 is to be performed in the second phase. The process flow proceeds to Step S705 when the second pack ascertainment request is set to YES (S704: YES), and the process flow proceeds to Step S711 when the second pack ascertainment request is set to NO (S704: NO).

Step S705: The identification estimating unit 12 of the battery control device 10 acquires (reads) identification information stored in the storage unit 22 of the battery pack 20 via the battery monitoring unit 24. When the identification information is acquired, the process flow proceeds to Step S706.

Step S706: The identification estimating unit 12 of the battery control device 10 identifies the type of the battery 21 incorporated in the battery pack 20 based on the identification voltage acquired from the battery pack 20 (first identification). Specifically, the identification estimating unit 12 identifies the type of the battery 21 by identifying the type corresponding to the identification voltage based on the type information stored in the storage unit 11. The type of the battery 21 which is identified based on the identification voltage is referred to as a "type based on first identification." When the type based on first identification is acquired as the identification result, the process flow proceeds to Step S707.

Step S707: The identification estimating unit 12 of the battery control device 10 identifies the type of the battery 21 incorporated in the battery pack 20 based on the identification information acquired from the battery pack 20 (second identification). Specifically, the identification estimating unit 12 identifies the type of the battery 21 by identifying the type corresponding to the identification information based on the type information stored in the storage unit 11. The type of the battery 21 which is identified based on the identification information is referred to as a "type based on second identification." When the type based on second identification is acquired as the identification result, the process flow proceeds to Step S708.

Step S708: The identification estimating unit 12 of the battery control device 10 compares the type based on the first identification (an identification result of the first identification) and the type based on the second identification (an identification result of the second identification) which are stored in the storage unit 11, and determines whether the two types (the two identification results) match. The process flow proceeds to Step S709 when the type based on first identification and the type based on second identification match (S708: YES), and the process flow proceeds to Step S710 when the type based on first identification and the type based on second identification do not match (S708: NO).

Step S709: Since the type based on first identification and the type based on second identification match, the identification estimating unit 12 of the battery control device 10 stores the matched type of the battery 21 as a comparison result in the storage unit 11. When the comparison result is stored in the storage unit 11, the second phase of the battery estimation control according to the third example ends.

Step S710: Since the type based on first identification and the type based on second identification do not match, the identification estimating unit 12 of the battery control device 10 stores a predetermined type indicating mismatch or unclearness as a comparison result in the storage unit 11. For example, a predetermined type which does not correspond to any battery 21 incorporated in the battery pack 20 which can be connected to the battery control device 10 is used as the type indicating mismatch or unclearness. When the type information is the example illustrated in FIG. 2, Type "c" can be stored as the comparison result. The fact that the two types do not match may be notified of to the outside by displaying text, outputting a voice, or the like. When the comparison result is stored in the storage unit 11, the second phase of the battery estimation control according to the third example ends.

Step S711: The operation control unit 13 of the battery control device 10 determines whether writing of the IG-ON integrated time obtained by integrating an ignition-on time of the vehicle to the storage unit 22 has been completed in the battery pack 20. The process flow proceeds to Step S712 when writing of the IG-ON integrated time has been completed (S711: YES), and the determination of Step S711 is continuously performed until the writing is completed when the writing of the IG-ON integrated time has not been completed (S711: NO).

Step S712: The operation control unit 13 of the battery control device 10 reads the IG-ON integrated time from the storage unit 22 of the battery pack 20 and determines whether the currently read IG-ON integrated time (a current value) is less than the previously read IG-ON integrated time (a previous value). The IG-ON integrated time (the previous value) may be stored in the battery control device 10 (the storage unit 11 or the like thereof) until the IG-ON integrated time (the current value) is newly read from the battery pack 20. The process flow proceeds to Step S705 when the current value of the IG-ON integrated time is less than the previous value (S712: YES), and the second phase of the battery estimation control according to the third example ends when the current value of the TG-ON integrated time is not less than the previous value (S712: NO).

Detectability of combination mismatch based on comparison between the battery estimation control according to the first example and the second example and the battery estimation control according to the third example in cases in which the type of the battery 21 is switched from cell A to cell B without detaching the battery pack 20 is illustrated in FIG. 8. FIG. 8 illustrates estimation details in case <1> which is a correct combination in which the battery 21 has been replaced and identification information has been rewritten, case <2> which is an incorrect combination in which the battery 21 has been replaced and identification information has not been rewritten, and case <3> which is an incorrect combination in which the battery 21 has not been replaced and identification information has not been rewritten.

With the battery estimation control according to the first and second examples, the type of the battery 21 can be correctly estimated in case <1> and case <2>, but the type of the battery 21 cannot be correctly estimated in case <3>. On the other hand, with the battery estimation control according to the third example, the type of the battery 21 can also be correctly estimated in case <3>.

Operations and Advantages

The battery control device according to the embodiment of the present disclosure estimates a type of a battery based on a type of the battery which is identified based on an identification voltage (first identification) and a type of the battery which is identified based on identification information (second identification). Since the type of the battery is estimated based on two or more different identification results in this way, it is possible to improve accuracy for estimating the type of the battery.

The battery control device according to the embodiment does not permit execution of a first operation when the type of the battery identified based on an identification voltage (first identification) and the type of the battery identified based on identification information (second identification) do not match each other and when both types match each other and the matched type does not match the type of the battery registered in type information stored in a storage unit. Accordingly, when a type of a battery cannot be estimated and a battery other than a regular battery is attached, it is possible to prohibit an operation using the battery.

The battery control device according to the embodiment does not perform an identification process in principle when the type based on first identification and the type based on second identification match each other and the matched type matches the type of the battery registered in the type information stored in the storage unit until replacement of the battery is determined later. Accordingly, it is possible to decrease a process load of the battery control device.

With the battery control device according to this embodiment, for example, even when the "comparison result" stored in the storage unit 11 is not reset (cleared) at the time of replacement of the battery such as when an operation of replacing only a battery cell without detaching the battery pack is performed for avoiding deletion of details of a memory in an onboard audio system or an onboard navigation system, it is possible to improve accuracy for correctly estimating the type of the battery by employing the battery estimation control according to the third example.

While an embodiment of the present disclosure has been described above, the present disclosure can be understood as a battery control device, a battery control method that is performed by a battery control device including a processor and a memory, a control program for performing the battery control method, a non-transitory computer-readable storage medium having the control program stored therein, and a vehicle in which a power supply system including the battery control device is mounted.

The battery control device according to the present disclosure can be applied to a vehicle having a battery mounted therein, or the like.

What is claimed is:

1. A battery control device comprising:
   one or more processor configured to:
   perform a first identification including acquiring an identification voltage which is output according to a type of a battery from the battery and identifying the type of the battery based on the acquired identification voltage;
   perform a second identification including acquiring identification information for identifying the type of the battery from the battery and identifying the type of the battery based on the acquired identification information;
   estimate the type of the battery based on an identification result of the first identification and an identification result of the second identification, including:
   estimating the type identified by the first identification and the second identification to be the estimated type of the battery when the identification result of the first identification and the identification result of the second identification match, and
   estimating the type of the battery to be unclear when the identification result of the first identification and the identification result of the second identification do not match;
   determine whether the battery has been replaced;
   store the type of a battery to be controlled; and
   prohibit execution of a first operation including an operation of transitioning from manual driving to automated driving when the estimated type of the battery does not match the stored type of the battery to be controlled, wherein the one or more processor is configured to perform the second identification for identifying the type of a battery that replaced the battery when (1) the estimated type of the battery matches a type of the battery that is stored and (2) the one or more processor determines that the battery has been replaced.

2. The battery control device according to claim 1, wherein the one or more processor is configured to prohibit execution of the first operation when the estimated type of the battery matches the stored type of the battery to be controlled and when the identification result from the first identification and the estimated type of the battery do not match.

3. The battery control device according to claim 1, wherein
the battery is mounted in a vehicle, and
the one or more processor is configured to:
perform the first identification of the type of the battery in a period in which a power supply system of the vehicle is operating, and
perform the second identification of the type of the battery in a period in which the power supply system of the vehicle is not operating.

4. The battery control device according to claim 1, wherein
the battery is mounted in a vehicle, and
the one or more processor is configured to perform the first identification and the second identification of the type of the battery in a period in which a power supply system of the vehicle is operating.

5. A battery control method that is performed by a computer of a battery control device, the battery control method comprising:
performing a first identification including acquiring an identification voltage which is output according to a type of a battery from the battery and identifying the type of the battery based on the acquired identification voltage;
performing a second identification including acquiring identification information for identifying the type of the battery from the battery and identifying the type of the battery based on the acquired identification information;
estimating the type of the battery based on an identification result of the first identification and an identification result of the second identification, including:
estimating the type identified by the first identification and the second identification to be the estimated type of the battery when the identification result of the first identification and the identification result of the second identification match, and
estimating the type of the battery to be unclear when the identification result of the first identification and the identification result of the second identification do not match;
determining whether the battery has been replace;
storing the type of a battery to be controlled; and
prohibiting execution of a first operation including an operation of transitioning from manual driving to automated driving when the estimated type of the battery does not match the stored type of the battery to be controlled, wherein the method further comprises performing the second identification for identifying the type of a battery that replaced the battery when (1) the estimated type of the battery matches a type of the battery that is stored and (2) the battery has been determined to have been replaced.

6. A non-transitory computer readable medium storing a control program which is executed by a computer of a battery control device, the control program causing the computer to perform a method comprising:
performing a first identification including acquiring an identification voltage which is output according to a type of a battery from the battery and identifying the type of the battery based on the acquired identification voltage;
performing a second identification including acquiring identification information for identifying the type of the battery from the battery and identifying the type of the battery based on the acquired identification information;
estimating the type of the battery based on an identification result of the first identification and an identification result of the second identification, including:
estimating the type identified by the first identification and the second identification to be the estimated type of the battery when the identification result of the first identification and the identification result of the second identification match, and
estimating the type of the battery to be unclear when the identification result of the first identification and the identification result of the second identification do not match;
determining whether the battery has been replace;
storing the type of a battery to be controlled; and
prohibiting execution of a first operation including an operation of transitioning from manual driving to automated driving when the estimated type of the battery does not match the stored type of the battery to be controlled,
wherein the method further comprises performing the second identification for identifying the type of a battery that replaced the battery when (1) the estimated type of the battery matches a type of the battery that is stored and (2) the battery has been determined to have been replaced.

7. A vehicle in which the battery control device according to claim 1 is mounted.

8. The battery control device according to claim 1, wherein the one or more processor is configured to determine whether the battery has been replaced based upon an ignition ON time.

9. The battery control device according to claim 8, wherein the one or more processor is configured to determine that the battery has been replaced when a currently read ignition ON time is less that a previously read ignition ON time.

* * * * *